US011703636B2

(12) United States Patent
Guan et al.

(10) Patent No.: US 11,703,636 B2
(45) Date of Patent: Jul. 18, 2023

(54) BORON NITRIDE NANOTUBE COATED OPTICAL WAVEGUIDE AND USES THEREOF

(71) Applicant: National Research Council of Canada, Ottawa (CA)

(72) Inventors: Jingwen Guan, Ottawa (CA); Huimin Ding, Ottawa (CA); Ping Lu, Stittsville (CA); Stephen Mihailov, Ottawa (CA); Benoit Simard, Orleans (CA)

( * ) Notice: Subject to any disclaimer, the term of this patent is extended or adjusted under 35 U.S.C. 154(b) by 145 days.

(21) Appl. No.: 17/607,086

(22) PCT Filed: Apr. 30, 2020

(86) PCT No.: PCT/IB2020/054066
§ 371 (c)(1),
(2) Date: Oct. 28, 2021

(87) PCT Pub. No.: WO2020/222152
PCT Pub. Date: Nov. 5, 2020

(65) Prior Publication Data
US 2022/0229225 A1      Jul. 21, 2022

Related U.S. Application Data

(60) Provisional application No. 62/842,191, filed on May 2, 2019, provisional application No. 62/841,779, filed on May 1, 2019.

(51) Int. Cl.
*G02B 6/02* (2006.01)
*C03C 25/1065* (2018.01)
(Continued)

(52) U.S. Cl.
CPC ...... *G02B 6/02395* (2013.01); *C01B 21/0648* (2013.01); *C03C 25/1061* (2018.01);
(Continued)

(58) Field of Classification Search
CPC .. G02B 6/02395; G02B 6/02076; G02B 6/14; G02B 1/12; C01B 21/0648;
(Continued)

(56) References Cited

U.S. PATENT DOCUMENTS

| 4,895,423 A | 1/1990 | Bilodeau et al. | |
| 6,231,980 B1 * | 5/2001 | Cohen | B82Y 30/00 |
| | | | 977/749 |

(Continued)

FOREIGN PATENT DOCUMENTS

| JP | H03158807 A | 7/1991 |
| WO | 2019/079882 A1 | 5/2019 |
| WO | 2019/079902 A1 | 5/2019 |

OTHER PUBLICATIONS

International Search Report and Written Opinion on PCT/IB2020/054066 dated Jun. 24, 2020.
(Continued)

*Primary Examiner* — Tony Ko
(74) *Attorney, Agent, or Firm* — Brunet & Co., Ltd.; Hans Koenig; Robert Brunet

(57) ABSTRACT

A solution is provided comprising boron nitride nanotubes (BNNTs) in a liquid solvent. An optical waveguide, such as an optical fiber, is contacted with the solution so as to form a layer of the solution supported on at least a portion of the optical waveguide. The liquid solvent is then removed from the layer of the solution supported on the optical waveguide in order to form a coating of the BNNTs on the optical waveguide. Further provided is a BNNT coated optical waveguide for use as a sensor.

28 Claims, 11 Drawing Sheets

(51) Int. Cl.
  *C03C 25/106* (2018.01)
  *C01B 21/064* (2006.01)
  *C03C 25/16* (2006.01)
  *G01N 21/41* (2006.01)

(52) U.S. Cl.
  CPC .......... *C03C 25/1068* (2018.01); *C03C 25/16* (2013.01); *G01N 21/41* (2013.01); *G02B 6/02076* (2013.01); *C01P 2004/03* (2013.01); *C01P 2004/13* (2013.01); *G01N 2021/4166* (2013.01); *G01N 2201/088* (2013.01)

(58) Field of Classification Search
  CPC . C03C 25/1061; C03C 25/1068; C03C 25/16; C03C 25/10; C03C 25/14; G01N 21/41; G01N 2021/4166; G01N 2201/088; C01P 2004/03; C01P 2004/13; C01P 2002/82; G01K 11/32; G01T 3/00; B82Y 20/00; B82Y 30/00; B82Y 40/00
  See application file for complete search history.

(56) References Cited

U.S. PATENT DOCUMENTS

| | | | |
|---|---|---|---|
| 9,784,912 B2 | 10/2017 | Kim et al. | |
| 10,228,485 B2 | 3/2019 | Shestakova et al. | |
| 10,228,510 B2 | 3/2019 | Alkeskjold et al. | |
| 2013/0119316 A1 | 5/2013 | Sauti et al. | |
| 2013/0255906 A1* | 10/2013 | Chang | F28F 99/00 165/11.1 |
| 2016/0231523 A1 | 8/2016 | Arora et al. | |
| 2018/0074128 A1 | 3/2018 | Wang et al. | |

OTHER PUBLICATIONS

Cho H, et al. Chem. Mater. 2020, 32, 3911-3921.
Corres JM, et al. Sensors and Actuators B 122 (2007) 442-449.
Gao Z, et al. ACS Appl. Mater. Interfaces 2011, 3, 627-632.
Girei SH, et al. Opt Rev (2015) 22:385-392.
Grobnic D, et al. Meas. Sci. Technol. 17 (2006) 980-984.
Guan J, et al. ChemistrySelect 2018, 3, 9308-9312.
Guan J, et al. Nanocomposites, 2018, vol. 4, No. 1, 10-17.
Ikuno T, et al. Solid State Communications 142 (2007) 643-646.
Jiang B, et al. IEEE Photonics Technology Letters, vol. 28, No. 9, May 1, 2016.
Kersey AD, et al. Journal of Lightwave Technology, vol. 15, No. 8, Aug. 1997.
Kim KS, et al. ACSNano. vol. 8, No. 6, 6211-6220 (2014).
Kim D, et al. Cite this: Chem. Commun., 2015, 51, 7104.
Kim KS, et al. Semicond. Sci. Technol. 32 (2017) 013003 (18pp).
Kim JH, et al. Nano Convergence (2018) 5:17.
Lau Y-TR, et al. J. Phys. Chem. C 2013, 117, 19568-19576.
Lee CH, et al. J. Phys. Chem. C 2012, 116, 1798-1804.
Liao Y, et al. Adv. Funct. Mater. 2014, 24, 4497-4506.
Love JD, et al. IEEE Proceedings J. vol. 138, No. 5, 343-354 (1991).
Lu P, et al. (2005) Meas. Sci. Technol. 16 1631.
Martinez-Rubi Y, et al. J. Phys. Chem. C 2015, 119, 26605-26610.
Mihailov S. Fiber Optic Sensors and Applications XIII, edited by Eric Udd, Gary Pickrell, Henry H. Du, Proc. of SPIE. vol. 9852, 98520P.
Mihailov SJ, et al. Sensors 2017, 17, 2909; doi:10.3390/s17122909.
Tiano A, et al. Nanosensors, Biosensors, and Info-Tech Sensors and Systems 2014, edited by Vijay K. Varadan, Proc. of SPIE vol. 9060, 906006.
Xie S-Y, et al. Chem. Commun., 2005, 3670-3672.
Xu Y, et al. Adv. Optical Mater. 2019, 1801433.
Yu J, et al. Solid State Communications 149 (2009) 763-766.
Zaghloul M, et al. 2017 International Conference on Optical Instruments and Technology: Advanced Optical Sensors and Applications, edited by Xuping Zhang, Hai Xiao, Francisco Javier Arregui, Proc. of SPIE vol. 10618, 106180C.
Zhang J, et al. Applied Optics Research. vol. 56, No. 31 (2017), 8828-8831.
Zhi C, et al. J. Phys. Chem. B 2006, 110, 1525-1528.
Zhi CY, et al. Chem. Asian J. 2009, 4, 1536-1540.
Kalay S, et al. Beilstein J. Nanotechnol. 2015, 6, 84-102.

* cited by examiner

BORON NITRIDE NANOTUBE COATED OPTICAL WAVEGUIDE AND USES THEREOF

FIELD

The invention relates generally to the field of optical waveguides and the use of soluble boron nitride nanotubes (BNNTs), more particularly to soluble BNNT-coated optical waveguides, and more specifically to soluble BNNT-coated optical fibers.

BACKGROUND

An optical waveguide is a spatially inhomogeneous structure for guiding light, restricting the spatial region in which light propagates. Waveguides usually include a region of increased refractive index, compared with the surrounding medium, cladding. However, other waveguide structures are absent a cladding layer such as microfab-produced ridge waveguides, rod of silica waveguides, sapphire waveguides, and other optical materials that guide light absent a cladding layer.

An optical fiber is a form of an optical waveguide that typically is formed of an optical core having a first index of refraction, an optical cladding surrounding the core comprising a second lower index of refraction and a coating surrounding the cladding for enhancing the fiber's durability. With this typical implementation, the core and cladding are selectable for optical response and the coating is selected for mechanical and chemical properties. That said, all three layers are restricted based on the optical response sought.

It has long been known that environmental characteristics of optical fibers affect the light propagating therein. For example, fiber Bragg gratings were found to be temperature sensitive, which lead to issues in using them in uncontrolled environments. Solutions to this temperature dependence have been proposed and implemented.

Conversely, it was realized that the sensitivity of fiber Bragg gratings to environmental conditions provides an opportunity for sensing applications. For example, changes in temperature lead to thermal expansion or contraction of optical fiber, resulting in changes in the refractive index and the spacing of the grating planes that can be measured using a fiber Bragg grating. Similar effects are observed in optical fiber due to other changes in condition, and fiber Bragg gratings have been used as sensors for a wide variety of sensing applications (e.g. see Kersey et al, 1997 and Mihailov et al, 2017). The use of fiber optics for sensing is a widespread field including the use of optical fiber and fiber Bragg gratings in varying devices such as physical sensors, chemical sensors and biosensors.

In the field of sensor design, there are often two separate considerations. First, responsiveness, and second, durability/viability to an environment. Clearly, some sensors are unsuited to some operating conditions. For durability/viability to an environment, housings and mountings are designed to protect sensors or to assist them in achieving their goals. For example, an electrical sensor for use underwater can be mounted within a waterproof housing.

Optical fibers play a key role in communications at light speed. They possess unique performance in harsh environments and extreme conditions. The major problem for high temperature applications of optical fibers for sensing is that current polymer coatings, including polyacrylate and polyimide, are decomposed at temperatures above 400° C. In US Patent Application Publication 2016/0231523, a high temperature fiber optic cable is described where the optical fiber is coated with a metal and placed within a ceramic fiber sleeve. This allows for higher temperature operation of the optical fiber. Unfortunately, the solution is more complex than a simple fiber coating process as it requires the addition of a sleeve. Further, coating methods with metal such as gold are quite expensive and gold coatings, which are the highest temperature coatings currently available, are only rated to 700° C., while for some harsh environments, higher operating temperatures are required.

It has now become apparent that an enhanced optical fiber for use in more extreme conditions would be beneficial.

SUMMARY

In the present disclosure, it has been demonstrated that boron nitride nanotubes (BNNTs) may be used to coat at least a portion of a surface of an optical waveguide, such as an optical fiber, and that a BNNT coated waveguide may be used for sensing applications.

Accordingly, in one embodiment, the present disclosure includes a method comprising: providing a solution comprising BNNTs in a liquid solvent; contacting at least a portion of an optical waveguide with the solution so as to form a layer of the solution supported on the optical waveguide; and at least partially removing the liquid solvent from the layer of the solution supported on the optical waveguide, thereby forming a coating of the BNNTs on the optical waveguide. In an embodiment, the optical waveguide is an optical fiber.

In embodiments of the method, contacting the at least a portion of the optical waveguide with the solution comprises at least one of submerging the at least a portion of the optical waveguide in the solution, dipping the at least a portion of the optical waveguide into the solution, spraying the at least a portion of the optical waveguide with the solution, drop-casting the at least a portion of the optical waveguide with the solution, and soaking the at least a portion of the optical waveguide in the solution.

In an embodiment, the method comprises repeating at least one time the steps of contacting the at least a portion of the optical waveguide with the solution and at least partially removing the liquid solvent from the layer of solution supported on the optical waveguide.

In embodiments of the method, the at least partial removal of the solvent is accomplished through pulling the optical waveguide out of the solution, through spontaneous evaporation of the solvent, or by air-blowing. In embodiments, the air-blowing comprises fume hood ventilation, compressed air-blowing, warm air-blowing or hot air-blowing.

In embodiments of the method, the solution comprising BNNTs is an aqueous solution or an organic solution.

In an embodiment of the method, the solution comprises single-walled BNNTs, double-walled BNNTs, few-walled BNNTs, and multi-walled BNNTs, or a combination of any two or more thereof.

In an embodiment of the method, the BNNTs are non-covalently associated with at least one polymer. In an embodiment, the at least one polymer is water-soluble. In another embodiment, the at least one polymer is soluble in organic solvent.

In an embodiment of the method, the BNNTs are non-covalently dispersed with a cationic or anionic surfactant.

In an embodiment of the method, the BNNTs are covalently functionalized. In an embodiment, the BNNTs are functionalized with at least one hydroxyl (OH) group. In an embodiment, the BNNTs are functionalized with at least one amine ($NH_2$) group. In an embodiment, the BNNTs are functionalized with at least one hydroxyl (OH) group and at least one amine ($NH_2$) group. In an embodiment, the BNNTs are functionalized with at least one hydrophilic functional group.

In an embodiment, the method further comprises treating at least a portion of the surface of the optical waveguide to increase uniformity of hydrophilicity across the treated surface prior to contacting the optical waveguide with the solution. In an embodiment, treating the at least a portion of the surface of the optical waveguide to increase uniformity of hydrophilicity comprises treatment with a hydrofluoric acid (HF) solution.

In an embodiment of the method, the coating of the BNNTs is formed on at least a portion of an optical fiber that defines a taper.

In an embodiment of the method, the coating of the BNNTs is formed on at least a portion of an optical fiber that defines a fiber Bragg grating.

In an embodiment, the method further comprises a step of heating the optical waveguide having the coating of BNNTs formed on the surface thereof at a temperature above 25° C. The heating may anneal the coating of BNNTs to the optical fiber. In embodiments, the heating is carried out at a temperature of 30° C. or higher, or 125° C. or higher. In a further embodiment, the heating is carried out at a temperature below the melting temperature of the optical waveguide.

In an embodiment, the method further comprises a step of coating the BNNT coating with a metal.

In an embodiment of the method, the BNNT solution comprises metal particles associated with the BNNTs.

A further embodiment is a method comprising: providing an optical fiber; treating at least a portion of the optical fiber with a hydrofluoric acid solution; providing a solution comprising boron nitride nanotubes (BNNTs) in a liquid solvent; contacting the at least a portion of the optical fiber with the solution so as to form a layer of the solution supported on the optical fiber; at least partially removing the liquid solvent from the layer of the solution supported on the optical fiber to form a coated optical fiber comprising a coating of the BNNTs on the at least a portion of the optical fiber to form a coated optical fiber comprising a coating of the BNNTs on the at least a portion of the optical fiber; and further coating the coated optical fiber with the BNNTs by: contacting the coated optical fiber with the solution so as to form a layer of the solution supported on the coated optical fiber; and at least partially removing the liquid solvent from the layer of the solution supported on the coated optical fiber, thereby further coating the coated optical fiber with BNNTs.

Another embodiment is an optical waveguide comprising: a physical structure that is capable of guiding electromagnetic waves in the optical spectrum; and a coating on at least a portion of a surface of the physical structure, wherein the coating comprises boron nitride nanotubes (BNNTs). In an embodiment, the physical structure is an optical fiber, the optical fiber comprising: a core having a first index of refraction; and a cladding having a second other index of refraction that is lower than the first index of refraction.

In an embodiment of the optical waveguide, a maximum thickness of the coating is between 1 μm and 10 μm. In another embodiment, a maximum thickness of the coating is 1 mm. In an embodiment, the coating is of substantially uniform thickness, having a variance in thickness of less than 200 nm. In an embodiment, the coating substantially covers the surface of the physical structure, although opposing surfaces of the physical structure, or portions thereof, may remain uncoated to allow optical light to enter and exit the structure. For example, the longitudinal surface of an optical fiber may be substantially covered by the coating, while the end surfaces of the optical fiber may not be covered by the coating. In an embodiment, the physical structure comprises a sensing portion, and the surface of the sensing portion is substantially covered by the coating. In an embodiment, a minimum thickness of the coating is a single layer of individual BNNTs. In an embodiment, the coating comprises a plurality of separately applied layers of BNNTs. In an embodiment, the plurality of separately applied layers of BNNTs are substantially more aligned to the longitudinal fiber axis than random orientation. In an embodiment, the BNNT coating is aligned with variable alignment degree through a dip-coating process or a spray-coating process.

In an embodiment, a portion of the optical fiber defines a taper having a waist and the BNNT coating is formed at least on the waist of said portion of the optical fiber.

In an embodiment, within a portion of the optical fiber is a fiber Bragg grating and the BNNT coating is formed at least on said portion of the optical fiber.

In an embodiment, polyhedral boranes are confined inside the BNNTs.

In an embodiment, the BNNT coating comprises at least one polymer matrix. In another embodiment, the coating comprises BNNTs infiltrated with a filler, wherein the filler comprises a polymer, an epoxy resin, nanoparticles, or a combination of any two or more thereof.

A further embodiment is an optical waveguide as described herein, or produced according to a method as described herein, for use in an environment having levels of neutron radiation above detectable levels, optionally the level of neutron radiation is above 0.3 mSv/year. A further embodiment is use of such an optical waveguide in such an environment.

A further embodiment is an optical waveguide as described herein, or produced according to a method as described herein, for use in an environment having a temperature above 400° C. In an embodiment, the environment has a temperature of 700° C. or higher. A further embodiment is use of such an optical waveguide in such an environment.

An embodiment is an optical fiber coated with BNNTs for use as a sensor. In embodiments the optical fiber is for use as a neutron sensor, a chemical sensor, a humidity sensor, a temperature sensor, a strain sensor, or a biosensor. A further embodiment is use of such an optical fiber as a sensor, optionally as a neutron sensor, a chemical sensor, a humidity sensor, a temperature sensor, a strain sensor, or a biosensor.

Another embodiment is a method of detecting a chemical, the method comprising: measuring transmission of light through an optical waveguide have a coating comprising BNNTs on at least a portion of a surface of the optical waveguide to determine a pre-exposure light transmission signal, exposing the optical waveguide to an environment that is suspected of containing a chemical of interest, and measuring transmission of light through the optical waveguide to determine a post-exposure light transmission signal, wherein a difference between the pre-exposure light transmission signal and the post-exposure light transmission signal indicates presence of the chemical of interest in the environment. In an embodiment, the optical waveguide is an optical fiber. In an embodiment, the chemical is an organic solvent or HCl gas. In an embodiment, the difference between the pre-exposure light transmission signal and the post-exposure light is a decrease in the post-exposure light transmission signal relative to the pre-exposure light transmission signal.

Another embodiment is a sensor comprising: an optical waveguide as described herein or an optical waveguide produced by a method as described herein, an optical light source configured to transmit optical light into the optical waveguide, and an optical power meter configured to receive a transmission of optical light from the optical waveguide. In an embodiment, the sensor is a neutron sensor, a chemical sensor, a humidity sensor, a temperature sensor, a strain sensor, or a biosensor. In an embodiment, the sensor is a chemical sensor.

BRIEF DESCRIPTION OF THE DRAWINGS

Exemplary embodiments of the invention will now be described in conjunction with the following drawings, wherein similar reference numerals denote similar elements throughout the several views.

DETAILED DESCRIPTION

Figure 1:
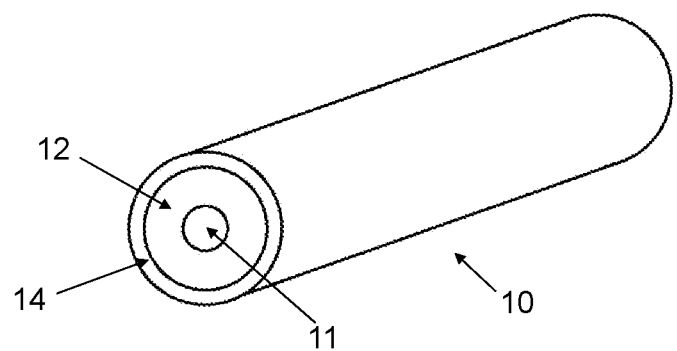
FIG. 1 is a cross sectional end view of an optical fiber.

The following description is presented to enable a person skilled in the art to make and use the invention and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the specific embodiments disclosed, but is to be accorded the widest scope consistent with the principles and features disclosed herein.

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, and/or steps, but do not exclude the presence of other unstated features, elements, components, groups, and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The term "and/or" as used herein means that the listed items are present, or used, individually or in combination. In effect, this term means that "at least one of" or "one or more" of the listed items is used or present.

As used in this application, the singular forms "a", "an" and "the" include plural references unless clearly dictated otherwise by context.

A boron nitride nanotube (BNNT) is a seamless cylinder formed of boron atoms and nitrogen atoms, the nanotube having a nanometer size in diameter and extending along a length. A "single-walled BNNT" is constructed by a single BN-atomic sheet forming a seamless cylinder; in the same manner, a "double-walled BNNT" has two nested cylinders formed of BN-sheets, a "few-walled BNNT" has 3 to 5 nested cylinders formed of BN-sheets, and a "multi-walled BNNT" has more than 5 nested cylinders formed of BN-sheets.

As used herein, "optical waveguide" refers to a physical structure that guides electromagnetic waves in the optical spectrum. Examples of optical waveguides, include, but are not limited to, ridge waveguides, rods of silica, sapphire and optical fiber. Optical waveguides can be classified according to their geometry (planar, which is also described as strip, or fiber), mode structure (single-mode, multi-mode), refractive index distribution (step or gradient) and material (glass, polymer or semiconductor).

An "optical fiber" is a dielectric waveguide that transmits light along its longitudinal axis. Because of its low loss, small size, passive nature, immunity to electromagnetic interference, resistance to harsh environments and corrosion conditions, optical glass fibers have been widely used in telecommunications, data transfer, networking, sensing, imaging, and power transmission.

A "fiber Bragg grating" (FBG) is a type of distributed Bragg reflector formed in a short segment of optical fiber that reflects particular wavelengths of light and transmits others. This can be realized by creating a periodic variation in the refractive index of the fiber core, which generates a wavelength-specific dielectric mirror. Therefore, FBGs are useful as inline optical filters to block or reflect certain wavelengths.

As used herein, "air-blowing" means exposure to forced airflow, generally for the purpose of hastening drying or solvent evaporation in a method as described herein. For example, airflow may be provided by a fan or a compressed air source. Exposure to airflow from a compressed air source is referred to herein as "compressed air-blowing". "Warm air-blowing" refers to air-blowing carried out at a temperature of about 20° C. to about 50° C., and "hot air-blowing" refers to air-blowing carried out at a temperature above about 50° C. However, air-blowing may be carried out at any suitable temperature.

Provided is a method for producing a coating of BNNTs on an optical waveguide by providing a solution comprising boron nitride nanotubes (BNNTs) in a liquid solvent; contacting the optical waveguide with the solution so as to form a layer of the solution supported on the optical waveguide; and at least partially removing the liquid solvent from the layer of the solution supported on the optical waveguide, thereby forming a coating of the BNNTs on the optical waveguide. In an embodiment, the optical waveguide is an optical fiber.

BNNT solutions may be produced by treatment of BNNTs with elemental bromine, for example as described in Guan et al (2018). Other methods to solubilize BNNTs are known in the art, including polymer wrapping (non-covalent association of BNNTs with at least one polymer); treatment with cationic, anionic, or polymeric surfactants; and chemical surface modification using anchoring functional groups. For example, PEG-1500N (a polyethylene glycol diamine) has been used, through coordination bond interaction, on surface boron sites to bring BNNTs into aqueous solution (Xie et al, 2005). Polymer wrapping has been used to obtain pure BNNTs in a chloroform solution (Zhi et al, 2006). The polymer used was the conjugated polymer poly(m-phenylenevinylene-co-2,5-dioctoxy-p-phenylenevinylene) (PmPV). A small cationic surfactant, such as ammonium oleate, has been used to bring BNNTs into solution (Yu et al, 2009). A BNNT aqueous solution has been formed by using flavin mononucleotides (FMN) through π-π stacking (Gao et al, 2011). Lee et al have solubilized BNNTs in water by adsorbing long alkyl chains onto the surface of BNNTs (Lee et al, 2012). Biopolymers have been used to coat BNNTs via a glycine-assisted interfacial process to bring BNNTs into aqueous solution (Lau et al, 2013). Y. Martinez et al (2015) have reported a purple solution of BNNTs with poly(3-hexylthiophene-2,5-diyl) (P3HT), formed by co-sonication of a suspension of BNNTs in chloroform with a P3HT-chloroform solution through π-π stacking. BNNTs have been functionalized with hydroxyl groups by reaction of BNNTs with hydrogen peroxide in an autoclave at high temperature and high pressure (Zhi, et al, 2009). The OH-functionalized BNNTs were able to form a stable aqueous solution/suspension. Amine-functionalized BNNTs in aqueous solution have been produced by treatment of BNNTs in 10 wt % ammonia solution due to etching and zipping-out (Liao et al, 2014). Amine-functionalized BNNTs in chloroform solution have also obtained through ammonian plasma irradiation (Ikuno et al, 2007). BNNTs have been functionalized with alkoxide groups through sonication in alcohol accompanied by the release of ammonia (Kim et al, 2015). These functionalized BNNTs are soluble in alcohols.

Referring to FIG. 1, an optical fiber 10 comprises a core 11 surrounded by a cladding sheath 12 having a lower refractive index than that of the core 11. The refractive index difference between the core 11 and the cladding sheath 12 causes light to be guided within the core. Outside the cladding, a coating layer 14 offers mechanical strength and chemical resistance. Various coating materials are currently used within their unique operation temperature limit: polyacrylate (−40° C. to 85° C.), polyimide (−190° C. to 350° C.), nylon (−40° C. to 100° C.), Tefzel (−40° C. to 200° C.), aluminum (−269° C. to 400° C.), and gold (−269° C. to 700° C.). For temperatures beyond 700° C. and corrosive environments, these coating materials no longer provide adequate protection. To allow use at temperatures beyond 700° C., optical fibers are typically coated in alumina ceramic materials.

For step index optical fibers the normalized frequency or V number is given by:

$$V = \frac{2\pi r}{\lambda}\sqrt{(n_{co}^2 - n_{cl}^2)} \quad (1)$$

where r is the radius of the fiber core 11, $\lambda$ is the wavelength and $n_{co}$ and $n_{cl}$ are the refractive indices of the core 11 and cladding 12 respectively. For single mode operation, $V \leq 2.405$. When a fiber is tapered, by using the hydrogen flame brushing technique for example (see Bilodeau et al, U.S. Pat. No. 4,895,423) the ratio of cladding/core radii remains constant however V decreases. As disclosed in Love et al (1991), when single mode optical fiber is tapered down such that the normalized frequency or V number of the taper is V<0.84, the fundamental $LP_{01}$ mode is no longer confined to the core but instead is guided by the cladding-air interface 25 resulting in a mode field with the same diameter as the tapered fiber.

In order to minimize coupling of the fundamental mode into higher modes within the taper, the tapering rate along the length of the fiber must be adiabatic. If z is the distance along the taper and $\rho$ is the local taper radius then the adiabatic condition can be written as:

$$\left|\frac{d\rho}{dz}\right| \leq \frac{\rho}{z_b} \quad z_b = \frac{2\pi}{(\beta_1 - \beta_2)} \quad (2)$$

where $z_b$ is a 'beat length', $\beta_1$ is the propagation constant of the fundamental $LP_{01}$ mode and $\beta_2$ is the propagation constant for the $LP_{02}$, which is the closest and most likely mode to which coupling will occur.

Figure 2:
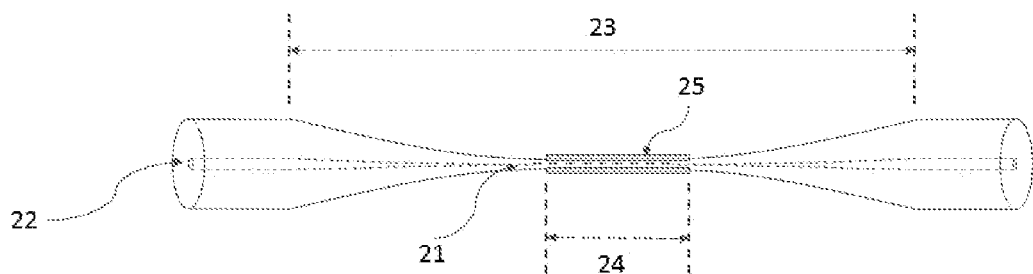
FIG. 2 is a cross sectional side view of a tapered optical fiber.

Referring to FIG. 2, shown is a simplified optical fiber having a taper. Optical fibers can be adiabatically tapered; the diameter of the core of the optical fiber gradually varies along its length from the original radius at 22 to a smaller radius at 21. When a fiber is tapered to a certain circumference, the waist section at 24, the fundamental LP01 mode is no longer guided in the core region but is instead guided with the cladding region of the taper 23. Light propagates within the fiber taper 23 producing an evanescent field radiating at a boundary of the taper waist 24 into the environment surrounding the optical fiber. By coating at least the waist portion 24 of the taper 23 with a sensitive layer of material 25, the optical and physical characteristics of the taper 23 are changed and the device is tunable. By monitoring the change of a light signal propagating therethrough, the environment surrounding the taper is accurately detectable. A choice of coating material is significant to make fiber sensor more sensitive, selective and robust in applications that need superior strength and chemical and temperature resistance in extreme environments. In addition, fiber Bragg grating (FBG) sensors are another important sensing technology, whereby a sensing function is a result of changes to the period of a modulated refractive index in the fiber and/or a mechanical response through the coating layer as a transducer.

Boron nitride nanotubes (BNNTs) are thermally stable over 800° C. in open air, and they have superlative mechanical strength, an extremely low density and a high aspect ratio due to their one-dimensional and hollow structure with a small diameter. Further, BNNTs are electrical insulators, they have chemical resistance in highly oxidative environment, and they are transparent to visible light. For example, oxidative resistance of BNNTs has been observed in chlorine at around 1000° C. (Cho et al, 2020). BNNTs also have high neutron radiation absorption. The density of neutron absorption may be enhanced even further by introducing polyhedral boranes inside the BNNT tubes.

As-produced BNNT material contains a variety of impurities, such as non-vaporized hexagonal boron nitride (h-BN) feedstock, newly formed amorphous h-BN flakes, organic and polymeric BN and BNH species and elemental boron. These impurities make as-produced BNNT material ineffective for use in coating optical fibers. Once purified, BNNTs bundle together unless they are disposed in solution through polymer wrapping, surfactant repulsion and/or covalent surface functionalization.

Figure 3:
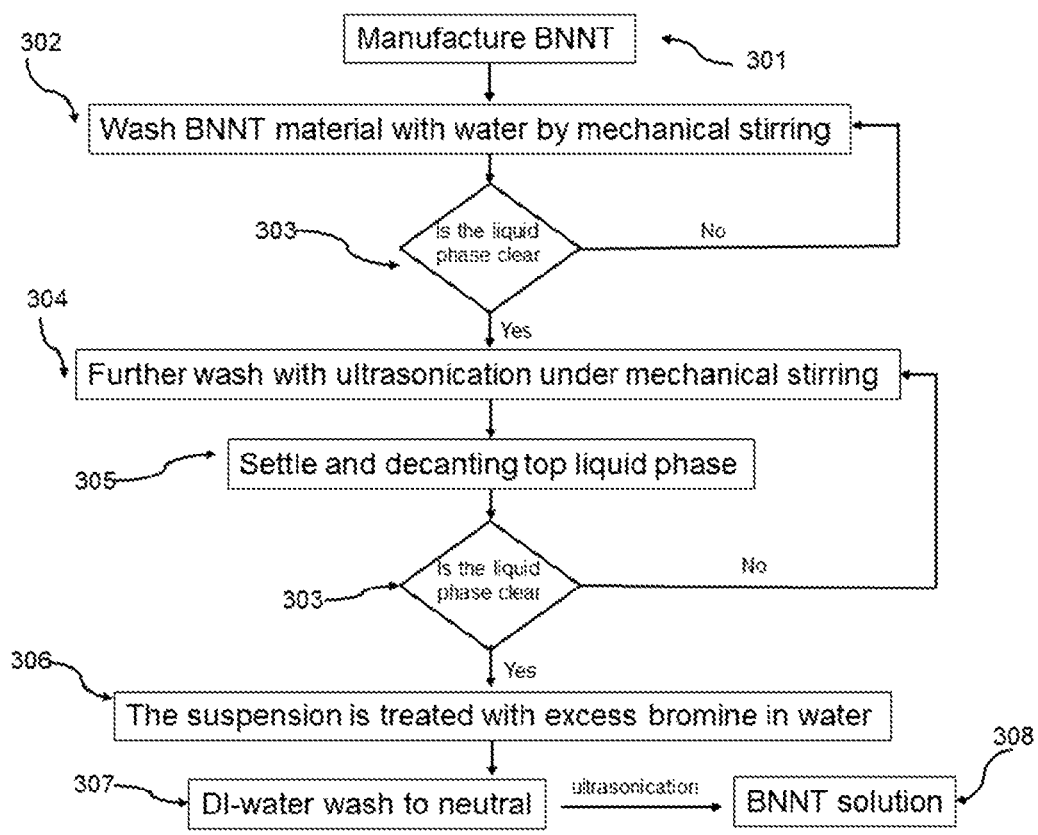
FIG. 3 is a simplified flow diagram of a method for preparing functionalized BNNT material for use in coating optical fibers.

Referring to FIG. 3, shown is a simplified flow diagram of a method of forming an aqueous solution of BNNTs. At 301, BNNTs are manufactured including single walled BNNTs, few walled BNNTs (2-5), and multi walled BNNTs as described in Kim et al (2017) and references therein. For example, BNNTs may be manufactured using a high temperature thermal induction plasma process with commercial h-BN as a feedstock and hydrogen as a promotor as described in Kim et al (2014). These BNNTs have high crystallinity, few walls (2-5), small diameter (~5 nm), and a micrometer to a few 10 micrometer in length. Alternatively, other manufacturing methods may be relied upon for forming the BNNTs, as will be known to one skilled in the art.

At 302, most of BN-fine particles and BN-organic hydrophobic species are separated by floating and suspending in water solution through a few cycles of wash. A simple water wash process is repeated at 303 until the water phase becomes relatively clear and the hydrophobic organic BN-species are nearly completely absent. Impurities removed by washing are generally those that exist physically free from the BNNT tubes. There remain many impurities bonded and encapsulated with BNNT bundles. Ultrasonication together with continuous mechanical stirring at 304 is relied upon to dissociate the encapsulated impurities from the BNNTs into water phase. In order to limit the potential damage of ultrasonication to the quality of the BNNT tubes, the sonication time is controlled within 30 minutes in each cycle, once the mixture is settled and layered out, the top water layer is decanted at 305. At this point, washing the suspension is repeated at 304 if the water layer does not become clear to the naked eye. If the water layer appears relatively clear to the naked eye comparing with the water layer in the first few cycles, the process moves to the next step at 306.

Next, elemental boron is removed. This is performed through a process of adding bromine to the above suspension at 306, which allows for the transformation of elemental boron into boric acid.

The BNNT material changes from black to snow white after treatment with an excess amount of bromine, once the available elemental boron particles in the sample are completely etched by bromine into boric acid that is highly soluble in water. The excess bromine reacts further with BNNTs, with the assistance of gentle ultrasonication on the surfaces of BNNTs, and this leads to the cleavage of the polar B-N bond generating covalent surface functional OH and $NH_2$ groups. These functional groups are ionized in an acid or a basic condition, therefore they are not soluble in basic or acidic water. However, once the suspension is washed to neutral at 307, these functional groups form a hydrogen bonding network with water molecules, and therefore, such functionalized BNNT becomes water-soluble, and a BNNT-water solution with a decent concentrate is obtainable, for example with assistance of ultrasonication and is stable for a long period of time at 308. Further details about a procedure to produce water-soluble BNNTs can be found in Guan et al (2018). The resulting solution is ready for use in a coating process.

An organic BNNT solution may be used for the coating process. Suitable organic solvents will be apparent to one skilled in the art and organic BNNT solutions include, for example, a tetrahydrofuran (THF) BNNT solution, an acetone BNNT solution and a dimethylformamide (DMF) BNNT solution. An organic BNNT solution may be prepared by extracting a wet paste of BNNTs from a neutrally washed BNNTs, produced as described above with the assistance of bath-ultrasonication. The water-wet paste of BNNTs may be washed with the corresponding organic solvent to remove the remaining water in the BNNT-paste, and then the subsequent organic extraction is ready for use in a coating process. The wash step may be carried out with mechanical stirring and the subsequent organic extraction may be carried out with ultrasonication.

Commercially available single-mode optical fiber for communication typically comprises a core, a cladding and an overcoat with polymer (commonly with polyacrylate (PA) or polyimide (PI)), or a metal layer (Ag or Au). Each coating material presents advantages and drawbacks. The polymeric overcoats offer great flexibility and strength, but they can only be used below 480° C. The metal overcoats are able to raise the applicable temperature up to 700° C. However, for many harsh environment sensing applications, coating stability at temperatures much higher than 700° C. are often required.

It is believed that use of a nanomaterial as an alternate coating for optical fiber may present significant advantages. For instance, BNNTs have the potential to offer both thermal resilience and strength. When used as a coating according to the embodiments described herein, BNNTs are transparent to visible light, are able to withstand high temperatures in open air, are chemically stable in hash conditions, and may provide neutron radiation shielding.

Figure 4:
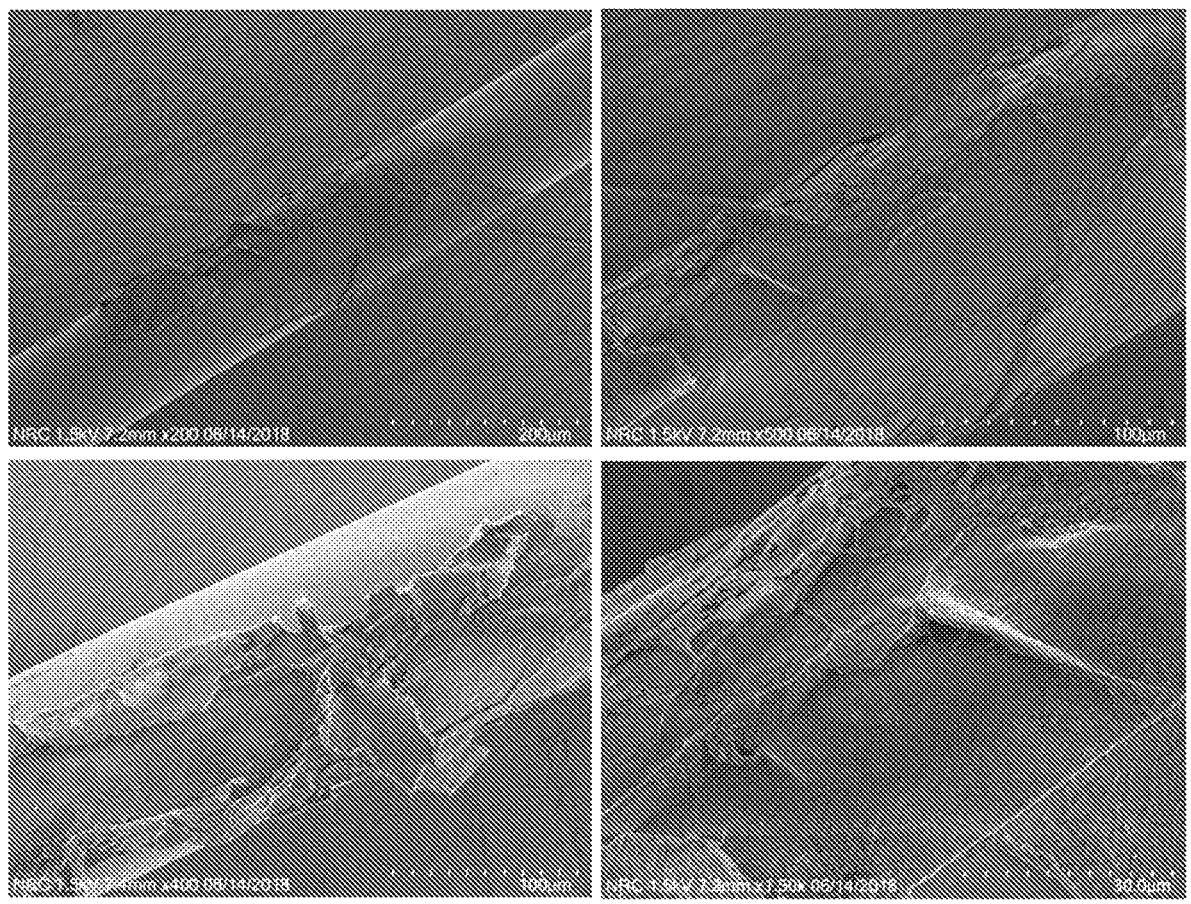
FIG. 4 is a plurality of SEM images at different magnifications showing inconsistent BNNT coating on non-surface-pretreated optical fibers.

Our studies of the coating of the water-soluble BNNT solution on different substrates, such as on polytetrafluoroethylene (PTFE) film, polyethylene terephthalate (PET), polycarbonate (PC) and glass slide, indicated that conventional coating technologies such as dip-coating, drop-casting and spray-coating have the potential to work to form BNNT coatings on substrates. A challenge of the coating of an aqueous BNNT solution on a glass fiber surface is hydrophilicity. A useful and controllable coating layer for a fiber optic waveguide is preferably a continuous and uniform structured layer. Initial studies revealed that it can be difficult to obtain a uniform layer of BNNTs, particularly when coating a non-uniformly hydrophilic surface of an optical waveguide. Coated optical fibers were prepared by dip-coating optical fiber into an aqueous solution of BNNTs produced according to the method described in Guan et al (2018). As shown in FIG. 4, the resulting coated optical fiber showed local coating, variable coat thickness, and coat instability (self peel off). The lack of uniform coating is believed to result from a lack of uniformity of hydrophilicity of the optical fiber. Such results suggest that a treatment to improve the hydrophilicity of the optical fiber may be required prior to coating the optical fiber with the BNNT solution.

The images in FIG. 4 highlight that a surface of a glass fiber may lack uniformity of hydrophilicity. In order to achieve a homogenous coating on a surface of a desired area, a commercial optical glass fiber, from which the polymeric overcoat was removed before use, was soaked in HF (48%) for 5-10 minutes, and then thoroughly washed with DI-water. The resulting fresh-surfaced optical fiber—the HF treated optical fiber—was then dip-coated with a BNNT-water solution such as that described hereinabove. After the coating was completed, the entire piece of coated fiber was examined under a scanning electron microscope (SEM) from one end to the other end, and it was found that the BNNTs were substantially uniformly coated on the surface of the glass fiber as demonstrated in FIG. 5. Unlike the coating situation for the non-HF-treated fiber shown in FIG. 4, this quality of BNNT-coat is desirable for monitoring the change of a light signal passing through a BNNT-coated optical waveguide. Further, because the fiber was dip-coated, the coated BNNTs showed a certain degree of alignment along the longitudinal fiber axis.

HF treatment may be required when the hydrophilicity of the optical waveguide, such as an optical fiber, lacks uniformity. If an optical waveguide has sufficient hydrophilicity to allow a substantially uniform coating of BNNTs to form without HF treatment, then HF treatment is optional. When HF treatment is used, it should be performed for a sufficient time to etch the surface of the optical waveguide and allow a substantially uniform coating of BNNTs to form. The duration of treatment and the concentration of HF may be determined empirically for any particular optical waveguide material. Typically, HF is used at a concentration of 20% to 48%. Use of a higher HF concentration allows for a shorter treatment time to be employed, whereas use of a lower HF concentration may require a longer treatment time. The duration of treatment typically ranges from about 2 minutes to about 1 hour, depending upon the concentration of HF applied. For example, the optical waveguide may be treated with commercially available HF (48%) for a duration of at least 2 minutes, at least 3 minutes, at least 5 minutes, or up to 10 minutes.

The process of dip-coating is repeatable for producing thicker coating layers. Alternatively, another method for controlling coating thickness is employable, such as drop-casting or spray-coating. A coating thickness of 10 nm-5 µm is typically desired. Other thicknesses of coating are also applicable, so long as they do not negatively impact operation of the manufactured device. BNNT coating layers thicker than 5 µm can be achieved with the processes described herein as an application requires.

To form a single layer of substantially uniform thickness, a fiber is dip-coated and the coating is dried, resulting in a substantially uniform coating having a known thickness. The coating process is then repeated until the thickness of the layers is the desired uniform thickness. Alternatively, between each dipping process, a thickness of the resulting coating is measured and the coating process is repeated until a predetermined thickness is reached.

In some applications, optical fibers are tapered, typically providing larger diameter portions of a fiber, often at ends thereof. As stated previously for single-mode fibers, the V number given in eq. (1) is V≤2.405. When a fiber is tapered, the ratio of cladding-core radii remains constant, however, V decreases. The transition of the fundamental guided mode supported by the single-mode fiber from a core-cladding guided into a cladding-air guided mode occurs when $$V < V_{CC} \cong \sqrt{\frac{2}{\ln S}} \left\{ 1 + \frac{0.26}{\ln S} \right\}^{-\frac{1}{2}} \qquad (3)$$

where S is the ratio of the cladding to core diameters. When the fiber diameter decreases below a certain level, the light wave originally confined in the fiber core starts to propagate in the cladding and a strong evanescent field is produced outside of the fiber cladding. Therefore, there are further issues in coating of tapered fibers as light mode propagation confined by the fiber includes portions within the coating layer.

Figure 6:
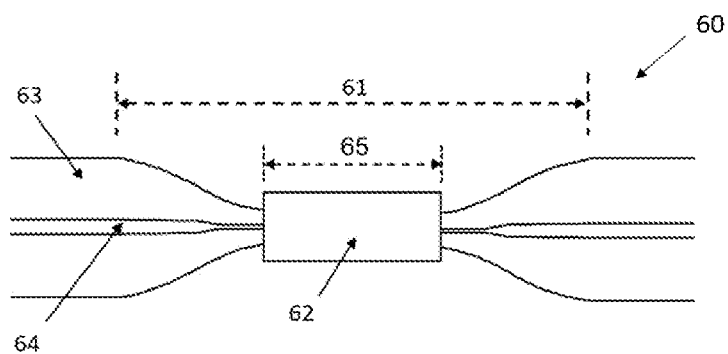
FIG. 6 is a simplified diagram of a tapered fiber having a waist coated with BNNTs.

Due to the BNNTs' highly porous structure, the refractive index of BNNTs has been found by the inventors to be smaller than that of silica (1.444 at 1500 nm) even though boron nitride has a higher refractive index than silica. After a taper is coated with BNNTs, evanescent light penetrates into the BNNT layer, resulting in some transmission loss. When the optical properties of a BNNT layer are changed by surrounding environments such as chemicals, gases, temperature, or humidity, the effective refractive index of the BNNT layer is also changed accordingly. Thus, transmission properties of a BNNT coated fiber taper are affected, and hence, changes in light signal are detectable for detecting changes in the environment surrounding a fiber taper. Based on this principle, a fiber optical sensor based on BNNT coating 60 is formable in accordance with FIG. 6 with a taper portion 61 and a waist portion 65 of the optical fiber coated with a BNNT coating 62, the optical fiber comprising a cladding 63 and a core 64.

Figure 7:
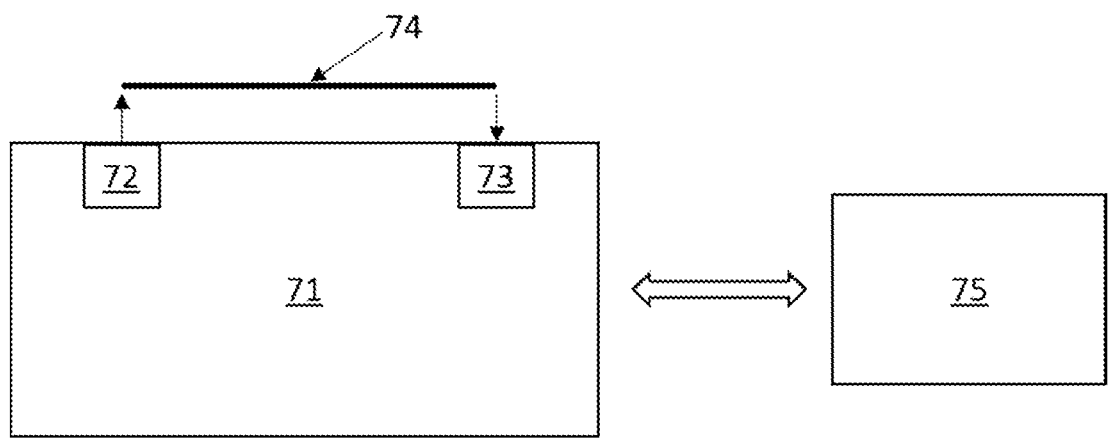
FIG. 7 is a simplified block diagram of a testing setup for evaluating BNNT coating effectiveness for a tapered optical fiber during the coating process with BNNT solution.

In an experiment, measuring optical signal change versus thickness of BNNT coating layer was performed while coating an optical fiber. Instead of using a BNNT-water solution to dip the fiber, a BNNT-acetone solution was used due to quick evaporation of acetone. Drop casting of BNNT-acetone solution on a fiber taper was performed while the taper was horizontally suspended in an opened glass boat. A fiber taper transmission signal was monitored during drop casting BNNT coating by a fast scan measurement set-up as shown in FIG. 7. The Agilent® Lightwave System (ALS) 71 comprises a tunable laser source (TLS) 72 provided as a fiber taper input signal and an optical power meter (OPM) 73 disposed at a fiber taper output port. A computer 75 coupled with the ALS was used to record a transmission spectrum of the fiber taper 74 before and after successive rounds of BNNT coating.

Figure 8A:
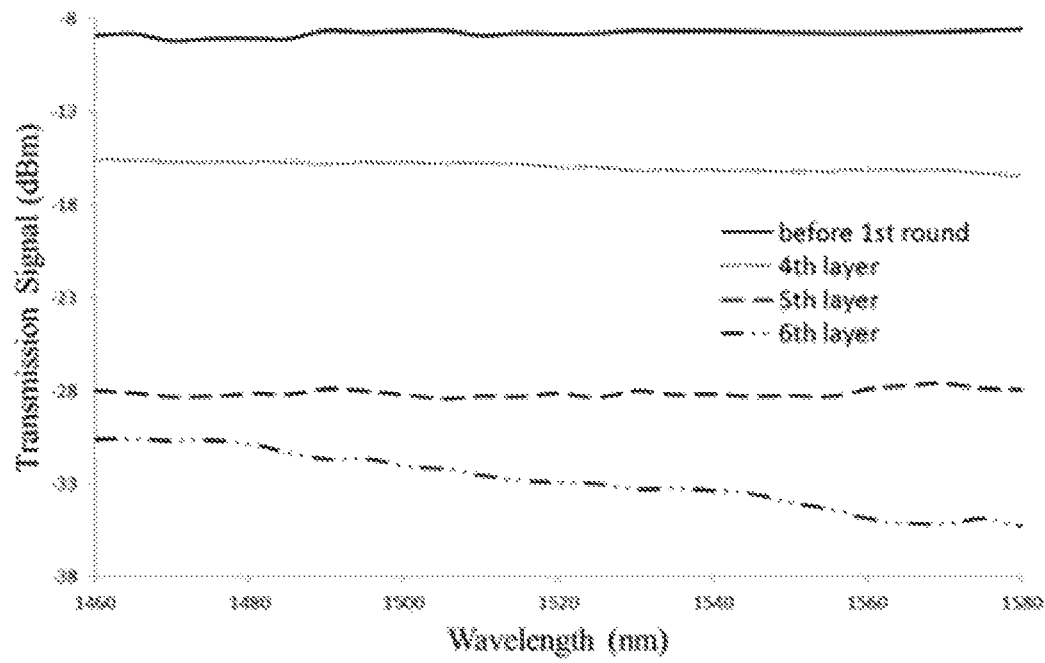
FIGS. 8A and 8B are graphs showing a plurality of changes of light transmission by a tapered optical fiber along the drop-casting process with a BNNT acetone solution.
Figure 8B:
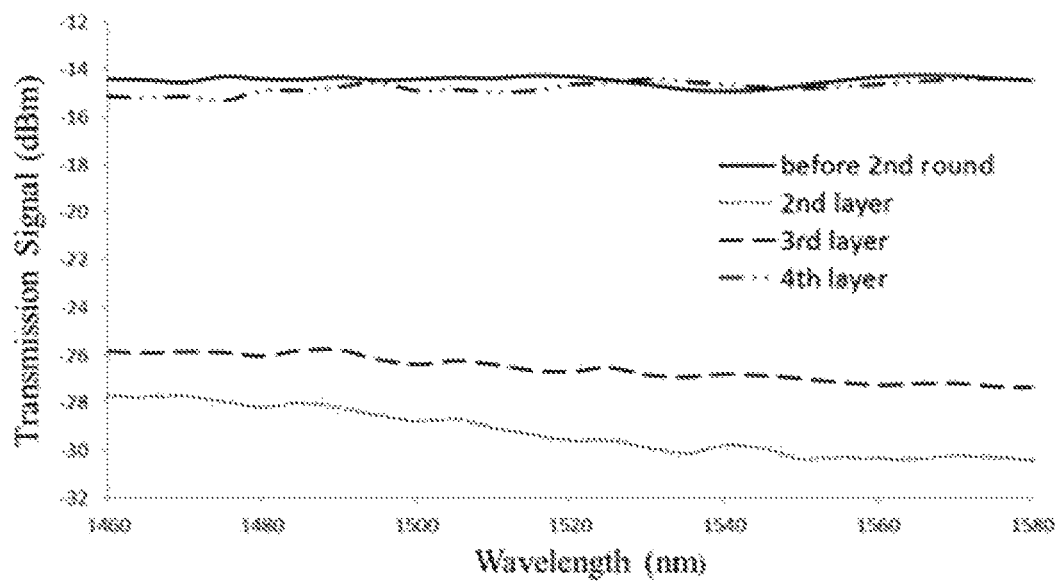

During the first round of BNNT coating, the transmission of the fiber taper significantly decreased with the BNNT coating thickness (4-6 layers of coating, estimated under 200 nm in total thickness), as shown in FIG. 8A. The BNNT-coated fiber taper was subsequently annealed at 125° C. for 18 hours and kept in the optical lab environment at room temperature for 6 weeks. A second round of BNNT-coating was carried out with the same BNNT-acetone solution. During the second round of coating, the fiber taper transmission continued to decrease for the first further layer of coating and then recovered to its original signal level with further coating layers, as shown in FIG. 8B. The change of transmission loss is due to the increase of BNNT layer thickness with BNNT coating cycles. During the first a few coatings, the BNNT thickness is less than the wavelength of light propagating in the taper and there is no smooth BNNT cladding layer deposited around the fiber taper, resulting in large scattering loss occurring at the taper-BNNT interface. When the BNNT thickness is much larger than the wavelength, a BNNT cladding layer (with smaller refractive index than that of silica) is formed around the taper and the light is guided again with reduced transmission loss.

By routine experimentation, the effectiveness of a coating process can be improved and/or a fiber taper profile and coating parameters can be tailored or optimized for desired applications. Further, analysis of wavelength sensitivity allows for selection of effective wavelengths for use in sensor applications. As shown in the graphs provided in FIGS. 8A and 8B, which show full transmission spectra, some wavelengths are more sensitive to the coating thickness than other wavelengths, so a sensitive wavelength can be accordingly selected for a certain application.

In some applications, the BNNTs may be functionalized with metal nanoparticles such as gold or silver prior to coating the optical fiber. Further alternatively, the BNNT layer may be coated with a layer of metal in the form of gold or another coating material. Further alternatively, the BNNT coating layer may be infiltrated and/or coated with an epoxy resin, a polymer and/or another material, for example by dip, soak or spray.

In some other applications, the BNNTs may be polyhedral boranes@BNNT, wherein, voids in the BNNTs may be occupied by polyhedral boranes. In such a way, polyhedral boranes may be encapsulated and confined along internal tunnels of the BNNT tubes to increase the density of neutron absorption.

Alternatively, an organic solution of BNNTs may be used to coat an optical fiber as illustrated in FIGS. 8A and 8B, where a solution of BNNTs in acetone is used to coat on the fiber taper. Organic solutions have the benefit of quick evaporation of solvent for the purpose of in-situ measurement. An organic BNNT solution is more favorable for use on a surface that is less hydrophilic and/or more hydrophobic than the surface of a glass optical fiber, such as on plastic, for example, PC, PET and PTFE. However, organic BNNT solutions can also be used to coat glass optical fiber and other optical waveguides.

The BNNT solution may comprise one or more additives. For example, the BNNT solution may comprise one or more polymers and/or copolymers, one or more surfactants, nanoparticles, metal particles, or combinations thereof. Additives may be selected based on the desired properties of the BNNT coating. For example, metal particles may be added if there is a desire for an electrically conductive BNNT coating.

Figure 5:
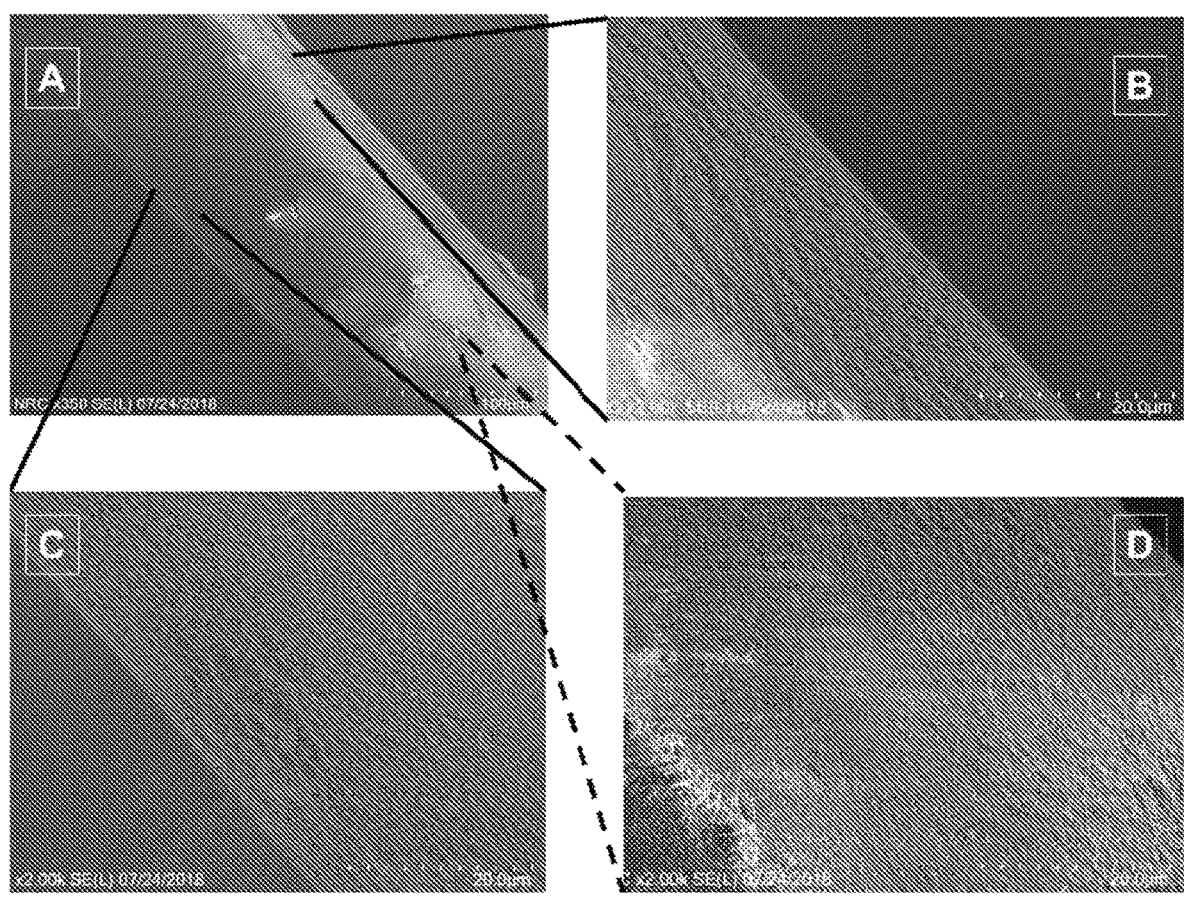
FIG. 5 is a plurality of SEM images showing consistent BNNT coating on surface-pretreated optical fiber in HF solution throughout the coating section. Panel A is a lower magnification SEM image of the coated optical fiber, and panels B, C, and D are higher magnification SEM images of regions of the coated optical fiber shown in panel A, as indicated by the solid and dashed lines leading from panel A to panels B, C, and D.

Alternatively, different coating techniques may be used such as drop-casting, dip-coating and spray-coating techniques. These and a choice of solvent may affect coating properties. For example, drawing a fiber through a BNNT solution forms an aligned coating along the direction in which the fiber is drawn as shown in FIG. 5, whereas non-directional application techniques such as drop-casting may not provide such alignment. Spray-coating can provide such alignment if carried out using a small enough nozzle and with appropriate unidirectional moving speed to allow directional application. Such alignment of the BNNT coating may be desirable for enhancing the strength and therefore extending the durability of the coated optical waveguide. Similarly, in some applications, different solvents present advantages such those described hereinabove.

BNNT coatings may also be formed by mixing BNNTs with one or more polymers and/or copolymers and coating the optical waveguide with the BNNT-polymer mixture. Additionally, another coating may be added over the BNNT coating. For example, a polymer coating such as polyimide may be added over the BNNT coating.

EXAMPLES

The operation of the disclosure is illustrated by the following non-limiting examples. As is apparent to one skilled in the art, many details of the examples may be changed while still practicing the disclosure described herein.

Example 1

Tapered Optical Fiber Fabrication

A tapered optical fiber was made by using a fused biconic tapered coupler fabrication jig with an oxy-hydrogen flame as taught in U.S. Pat. No. 4,895,423. The fiber was elongated in the flame by moving two translation stages in opposite directions and sweeping the flame along the fiber length (Lu et al, 2005). The transmission loss was continuously monitored during the fabrication. The fiber used was Fibercore SM1500(4.2/125)P with a cut-off wavelength window of 1350-1520 nm and mode field diameter of 4.0-4.5 µm@1550 nm. The waist length of the taper was 10 mm and the waist diameter was 30 µm. The total transmission loss during the tapering was less than 5%.

Example 2

BNNT Dip-Coating Process and Results

Figure 9:
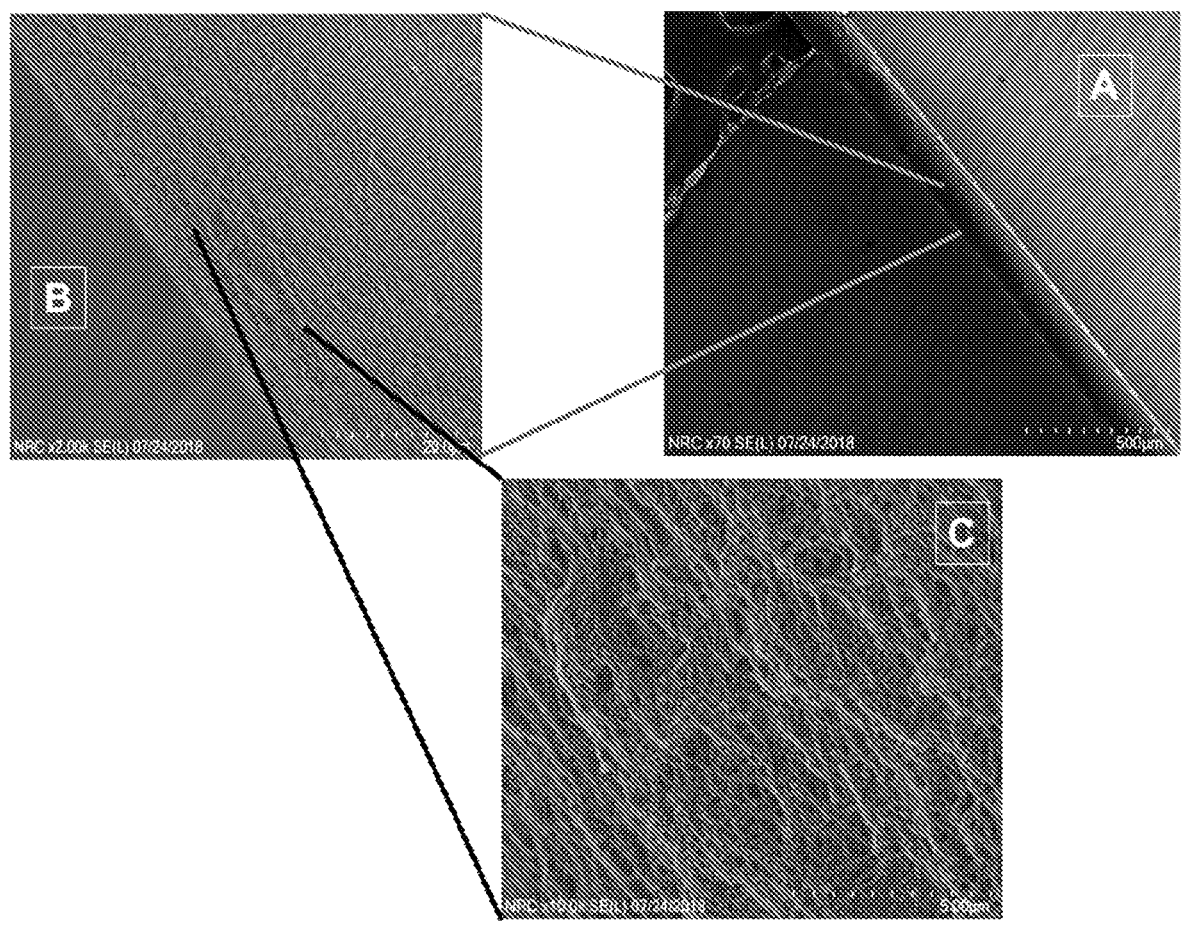
FIG. 9 shows SEM images of an optical fiber with a 125 μm cladding diameter coated with a layer of BNNTs. Image A is the lowest magnification image, image B is a higher magnification image of a region of the optical fiber shown in image A, as indicated by the solid lines leading from image A to image B. Image C is a higher magnification image of the region of optical fiber shown in image B, as indicated by the solid lines leading from image B to image C.

All of the experiments were conducted in a chemical exhaust fume hood. Before dipping into the BNNT solution, the optical fiber was soaked in 48% HF solution for 5 minutes to enhance the adhesion of the BNNTs to the fiber cladding and obtain a uniform BNNT coating. After the HF-treated the fiber was rinsed with filtered water through a 0.2 µm filter purchased from VWR, it was ready for BNNT dip-coating. One dip-coating cycle involves two steps: dipping the fiber into a saturated BNNT aqueous solution (Guan et al, 2018), keeping it in the solution for 30 min, and then pulling it out with a step-motor and drying in ambient air in a fume hood for another 30 minutes. Repeated dip cycles were used to increase the thickness of the BNNT layer. If desired, drying may be hastened by application of a warm or hot air-blowing, to reduce the amount of time required to carry out the coating process. FIG. 9 shows scanning electron microscope (SEM) images of a BNNT coated optical fiber with 125 μm cladding diameter after 24 dip-coating cycles. Image A in FIG. 9 demonstrates the uniformity of the BNNT coating around a large section of the optical fiber at low magnification. Image B in FIG. 9 shows the nanotubes' alignment along the dipping/fiber axis direction and uniform morphology at high magnification. Image C in FIG. 9 reveals the BNNTs' surface morphology at high magnification.

Figure 10:
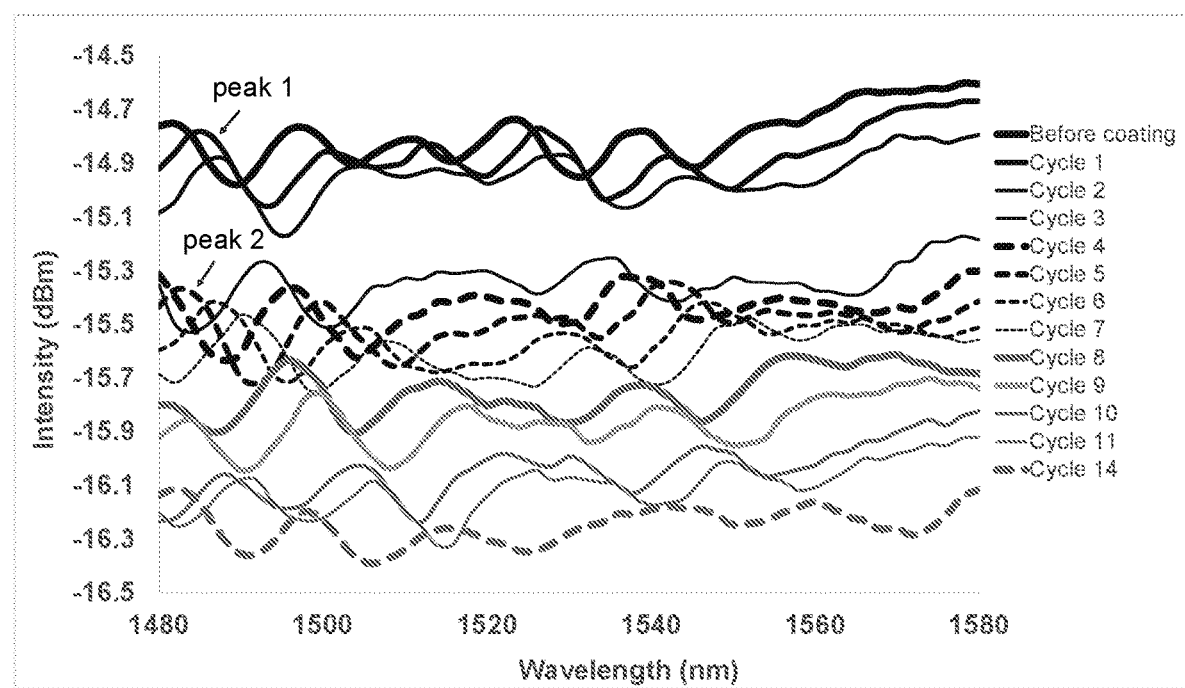
FIG. 10 is a graph showing a tapered optical fiber transmission spectra during a BNNT dip-coating process with a BNNT aqueous solution.
Figure 11:
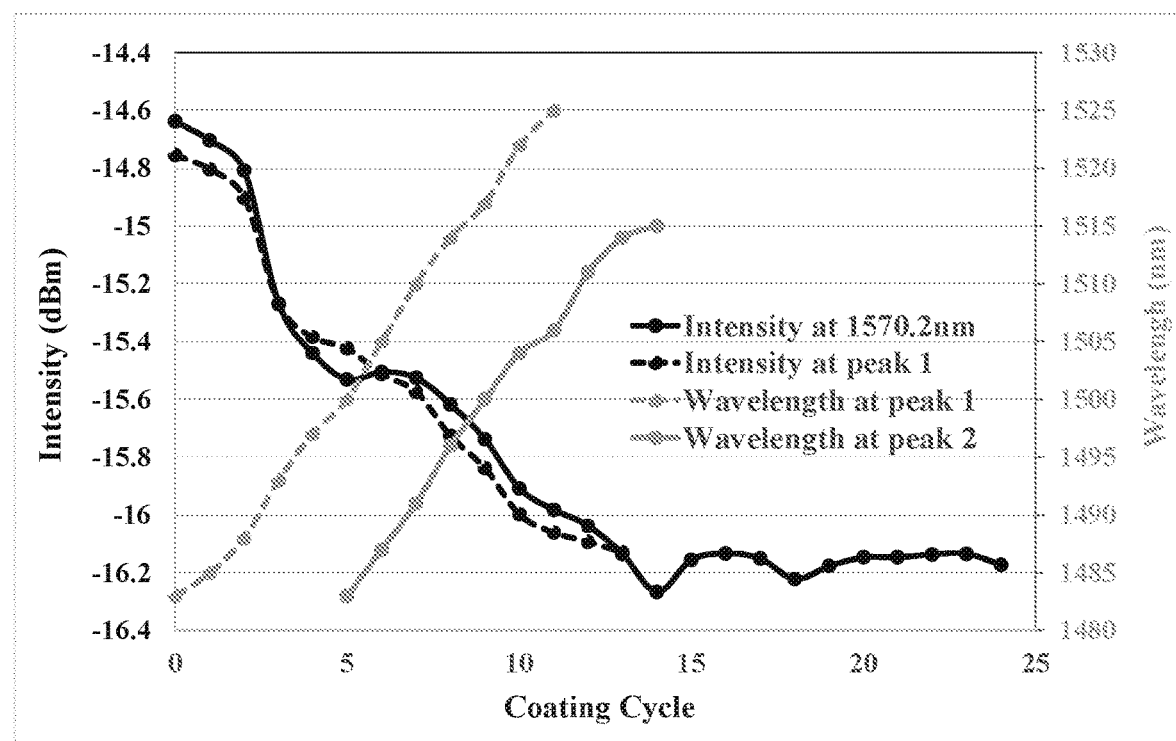
FIG. 11 is a graph showing how the tapered optical fiber transmission intensity and wavelength change with the addition of BNNT layers by dip-coating.

During the tapered optical fiber dip-coating process, the transmission spectrum of the tapered optical fiber was measured after each dip cycle (FIG. 10). Though the refractive index (RI) of boron nitride (1.8 (h-BN); 2.1 (c-BN)) is larger than that of silica (1.444 at 1500 nm), the effective RI of the BNNTs is reduced due to the BNNTs' highly porous structure, so light can still be guided in the BNNT coated tapered optical fiber. Since the tapered optical fiber allows the BNNT layer access to the evanescent wave of the propagating mode through the taper, the variation in the transmission spectrum is correlated with the amount of deposited BNNTs on the tapered optical fiber. FIG. 11 shows the transmission intensity and wavelength changes with the coating cycles.

A transmission intensity decrease of around 1.5 dB is observed in addition to a significant 42 nm red wavelength shift, which suggests the possibility of further exploration to correlate BNNT coating thickness and wavelength shift in BNNT coated FBG sensors by measuring the wavelength shift. Moreover, both the intensity change and the wavelength shift are linear with the number of dip cycles. After 14 cycles, the transmission spectrum became relatively stable.

Example 3

Liquid Based Sensing and Gas Sensing

In order to study the BNNT coating as a sensing medium on the tapered optical fiber, a bare tapered optical fiber with the same taper parameters described above, but without BNNT coating was used for comparison in all sensing experiments.

For liquid based sensing, the organic solvents acetone, hexane, tetrahydrofuran (THF), toluene, diethyl ether, and dimethylformamide (DMF), with refractive indices of 1.36, 1.375, 1.407, 1.497, 1.35, and 1.430, respectively, were used for the experiments. When the bare tapered optical fiber was submerged in each liquid, the transmission spectrum intensity changed within 1 dB, with the exception of toluene where the transmission signal dropped to the noise level. The huge loss of transmission signal in toluene is believed to be due to the fact that toluene has a larger RI than silica, so light cannot be guided and propagated along the tapered optical fiber. When the BNNT coated tapered optical fiber was put in the liquid, the amplitude of the transmission spectrum decreased to the noise level for all the liquids tested. As discussed previously, when the BNNT coated tapered optical fiber is in air, the porous BNNT coating is saturated with air. However, when the porous BNNTs are submerged in a liquid, the liquid penetrates into the BNNTs instead of air and increases the BNNTs' effective RI to be larger than that of silica. As a result, light cannot be guided by the BNNT coated tapered optical fiber. This demonstrates that BNNT coated tapered optical fiber can be used as a level sensor for liquids, even for those liquids with a RI smaller than silica, which is not possible when bare tapered optical fiber is used.

Figure 12:
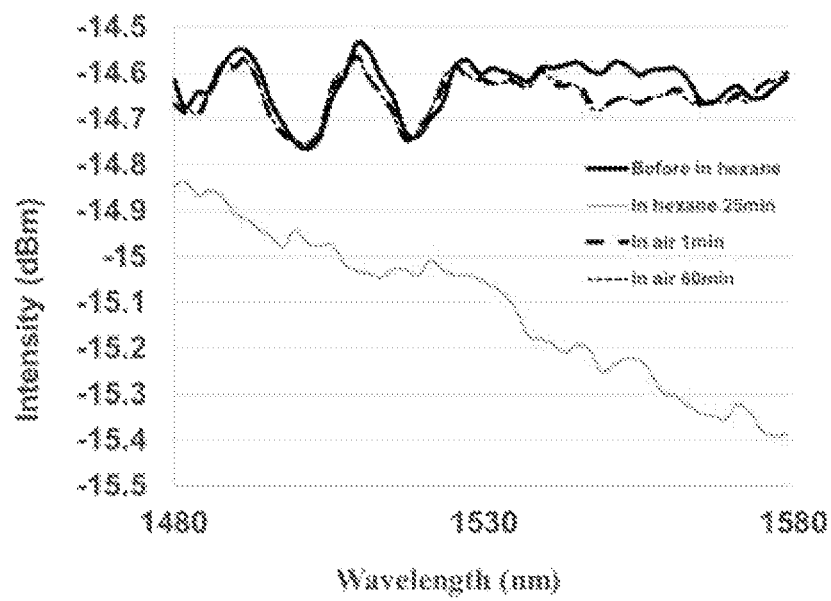
FIG. 12 is a graph showing the transmission spectra of a bare tapered optical fiber with no BNNT coating layer in hexane liquid and during the air drying process.
Figure 13:
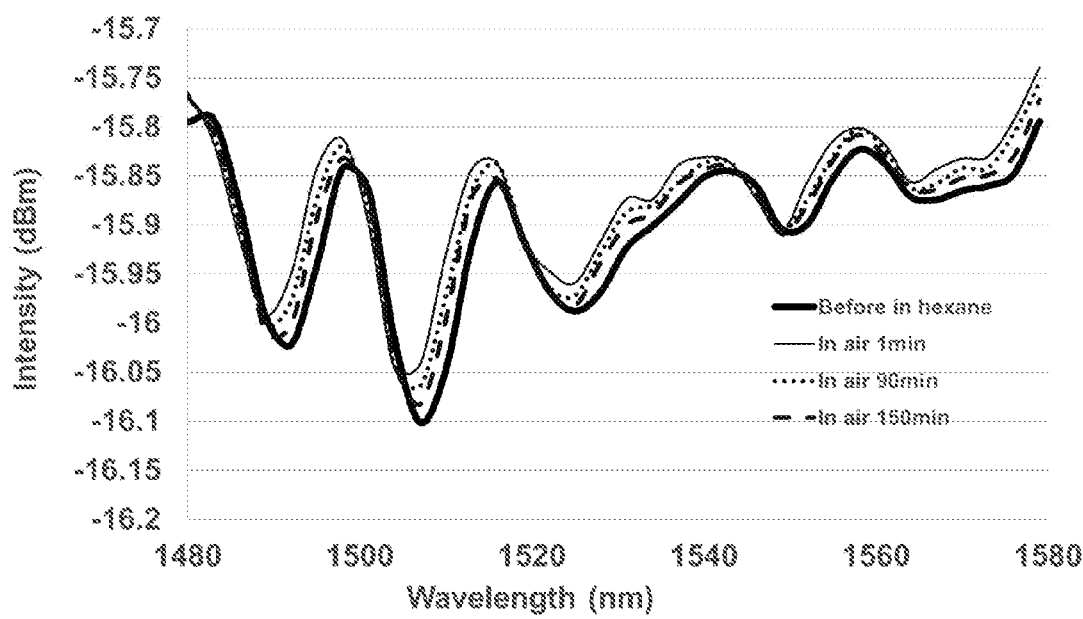
FIG. 13 is a graph showing the transmission spectra of a BNNT-coated tapered optical fiber in hexane liquid (noise level, not shown in the graph) and during the air drying process.

After the tapered optical fiber was tested in each liquid, it was dried in air at room temperature. For each tested solvent, the bare tapered optical fiber transmission intensity recovered to the original level within one minute. FIG. 12 shows the transmission spectra of the bare tapered optical fiber in hexane and during air drying process. In contrast, the BNNT coated tapered optical fiber needed hours to recover to the original level. FIG. 13 shows the BNNT coated tapered optical fiber transmission spectra during air drying process after the tapered optical fiber was pulled out of hexane. This demonstrated that the porous structure of the BNNT layer slowed down the chemical evaporation process due to the strong adsorption. Moreover, it was observed that different solvents have different recovery times, partly because of the different affinity of the organic solvents to the BNNT layer.

Figure 14:
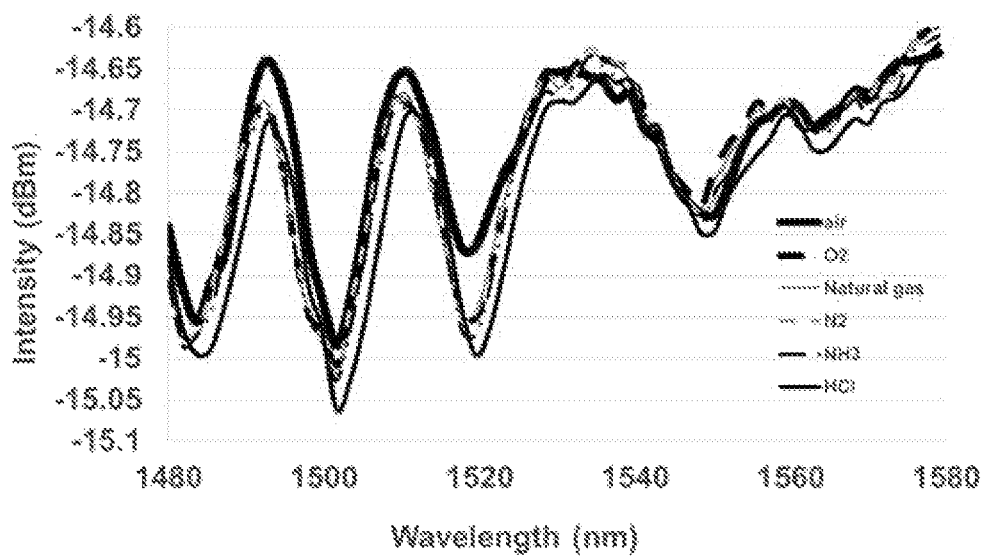
FIG. 14 is a graph showing the transmission spectra of the bare tapered optical fiber in various gases.
Figure 15:
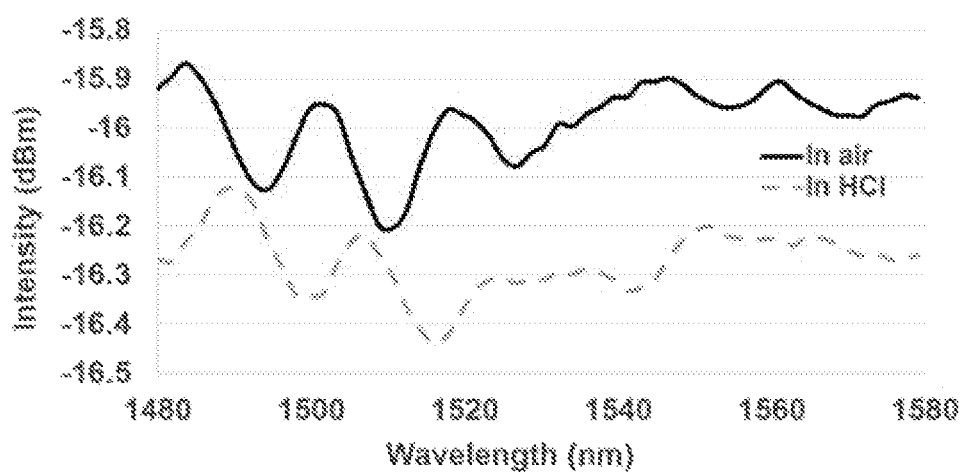
FIG. 15 is a graph showing the transmission spectra of the BNNT coated tapered optical fiber in HCl gas at atmosphere.

For gas sensing experiments, a gas was continuously flowing into an open glass cylinder in which the tapered optical fiber was suspended vertically while the transmission spectra were recorded. Natural gas, $O_2$, $N_2$, $NH_3$, and HCl were each tested individually. The bare tapered optical fiber's sensitivity to all the tested gases was very small as shown in FIG. 14, with intensity changes within 0.1 dB. For the BNNT-coated tapered optical fiber, in comparison to air, there was no observed sensitivity to $O_2$ and $N_2$, small sensitivity to $NH_3$ and natural gas, and significant sensitivity to HCl, as shown in FIG. 15. This is because the RI of each of the tested gases is close to 1, so that the effective RI of BNNT coating is smaller than that of silica. Without wishing to be bound by theory, it is believed that the significant transmission loss of the HCl gas may be due to the selective affinity of the porous BNNT coating for HCl, such that HCl gas (with RI of 1.0004456) becomes trapped in the BNNT coating and absorbs moisture from the air, resulting in a higher effective RI. These results suggest that BNNT-coated tapered optical fiber can be used to selectively detect some gases with high sensitivity due to the affinity of some gases with the BNNTs' unique porous structure.

While the present disclosure has been described with reference to what are presently considered to be preferred examples, it is to be understood that the disclosure is not limited to the examples described herein. To the contrary, the present disclosure is intended to cover various modifications and equivalent arrangements included within the appended claims, as understood in view of the common general knowledge in the art and the teachings of the disclosure as a whole.

All publications, patents, and patent applications cited herein are hereby incorporated by reference in their entirety to the same extent as if each individual publication, patent, or patent application was specifically and individually indicated to be incorporated by reference in its entirety. Where a term in the present disclosure is found to be defined differently in a document incorporated herein by reference, the definition provided herein is to serve as the definition for the term.

REFERENCES

The content of each of the following references is hereby incorporated by reference in its entirety.

Bilodeau, F; Hill, K O; Faucher, S; Johnson, D C, Fabrication technique for low-loss fused taper directional couplers and pressure sensor produced thereby, U.S. Pat. No. 4,895,423 A, United States Patent and Trademark Office, 23 Jan. 1990

Cho, H; Walter, S; Plunkett, M; Ruth, D; Iannitto, R; Martinez-Rubi, Y; Kim, K S; Homenick, C M; Brinkmann, A; Couillard, M; Dénommée, S; Guan, J; Jakubinek, M B; Jakubek, Z J; Kingston, C T; Simard, B, Scalable gas-phase purification of boron nitride nanotubes by selective chlorine etching, *Chemistry of Materials*, Publication date (web): 9 Apr. 2020, DOI: 10.1021/acs.chemmater.0c00144

Gao, Z; Zhi, C; Bando, Y; Golberg, D; Serizawa, T, Noncovalent Functionalization of Disentangled Boron Nitride Nanotubes with Flavin Mononucleotides for Strong and Stable Visible-Light Emission in Aqueous Solution, *ACS Applied Materials & Interfaces*, 2011, 3(3): 637-632

Guan, J.; Kim, K S; Jakubinek, M B; Simard, B, pH-Switchable Water-Soluble Boron Nitride Nanotubes, *ChemistrySelect*, 2018, 3: 9308-9312

Ikuno, T; Sainsbury, T; Okawa, D; Fréchet, J M J; Zettl, A, Amine-functionalized boron nitride nanotubes, *Solid State Communications*, 2007, 142(11): 643-646

Kersey, A D, Fiber grating sensors, *Journal of Lightwave Technology*, 1997, 15(8): 1442-1463

Kim, D; Nakajima, S; Sawada, T; Iwasaki, M; Kawauchi, S; Zhi, C; Bando, Y; Golberg, D; Serizawa, T, Sonication-assisted alcoholysis of boron nitride nanotubes for their sidewalls chemical peeling, *Chemical Communications*, 2015, 51: 7104-7107

Kim, K S; Kim, M J; Park, C; Fay, C C; Chu, S-H; Kingston, C T; Simard, B, Scalable manufacturing of boron nitride nanotubes and their assemblies: a review, *Semiconductor Science and Technology*, 2017, 32(1): 013003 (18pp)

Kim, K S; Kingston, C T; Hrdina, A; Jakubinek, M B; Guan, J; Plunkett, M; Simard, B, Hydrogen-Catalyzed, Pilot-Scale Production of Small-Diameter Boron Nitride Nanotubes and Their Macroscopic Assemblies, *ACS Nano*, 2014, 8(6): 6211-6220

Lau, Y-T R; Yamaguchi, M; Li, X; Bando, Y; Golberg, D; Winnik, F M, Facile and Mild Strategy Toward Biopolymer-Coated Boron Nitride Nanotubes via a Glycine-Assisted Interfacial Process. *Journal of Physical Chemistry C*, 2013, 117(38): 19568-19576

Lee, C H; Zhang, D; Yap, Y K, Functionalization, Dispersion, and Cutting of Boron Nitride Nanotubes in Water, *Journal of Physical Chemistry C*, 2012, 116(2): 1798-1804

Liao, Y; Chen, Z; Connell, J W; Fay, C C; Park, C; Kim, J W; Lin, Y, Chemical Sharpening, Shortening, and Unzipping of Boron Nitride Nanotubes, *Advanced Functional Materials*, 2014, 24, 24(28): 4497-4506

Love, J D; Henry, W M; Stewart, W J; Black, R J; Lacroix, S; Gonthier, F, Tapered single-mode fibres and devices. Part 1: Adiabaticity criteria, *IEE Proceedings Journal (Optoelectronics)*, 1991, 138(5): 343-354

Lu, P; Ding, H; Mihailov, S J, Direct measurement of the zero-dispersion wavelength of tapered fibers using broadband-light interferometry, *Measurement Science and Technology*, 2005, 16(8): 1631-1636

Martinez-Rubi, Y; Jakubek, Z J; Jakubinek, M B; Kim, K S; Cheng, F; Couillard, M; Kingston, T C; Simard, B, Self-Assembly and Visualization of Poly(3-hexyl-thiophene) Chain Alignment along Boron Nitride Nanotubes, *Journal of Physical Chemistry C*, 2015, 119(47): 26605-26610

Mihailov S J; Grobnic, D; Hnatovsky, C; Walker, R B; Lu, P; Coulas, D; Ding, H, Extreme Environment Sensing Using Femtosecond Laser-Inscribed Fiber Bragg Gratings, *Sensors*, 2017, 17(12): 2909 (33 pages)

Xie, S-Y; Wang, W; Fernando, K A S; Wang, X; Lin, Y; Sun, Y-P, Solubilization of boron nitride nanotubes, *Chemical Communications*, 2005, 29: 3670-3672

Yu, J; Chen, Y; Cheng, B M, Dispersion of boron nitride nanotubes in aqueous solution with the help of ionic surfactants, *Solid State Communications*, 2009, 149(19-20): 763-766

Zhi, C; Bando, Y; Tang, C; Honda, S; Sato, K; Kuwahara, H; Golberg, D, Purification of Boron Nitride Nanotubes through Polymer Wrapping, *Journal of Physical Chemistry B*, 2006, 110(4): 1525-1528

Zhi, C Y; Bando, Y; Terao, T; Tang, C C; Kuwahara, H; Goldberg, D, Chemically Activated Boron Nitride Nanotubes, *Chemistry—An Asian Journal*, 2009, 4(10): 1536-1540

What is claimed is:

1. A method for coating at least a portion of an optical waveguide with boron nitride nanotubes (BNNTs), the method comprising:
   providing a solution comprising BNNTs in a liquid solvent;
   contacting at least a portion of an optical waveguide with the solution so as to form a layer of the solution supported on the optical waveguide; and
   at least partially removing the liquid solvent from the layer of the solution supported on the optical waveguide, thereby forming a coating of the BNNTs on a surface of the optical waveguide.

2. The method of claim 1, wherein contacting the at least a portion of the optical waveguide with the solution comprises at least one of submerging the at least a portion of the optical waveguide in the solution, dipping the at least a portion of the optical waveguide into the solution, spraying the at least a portion of the optical waveguide with the solution, drop-casting the at least a portion of the optical waveguide with the solution, and soaking the at least a portion of the optical waveguide in the solution.

3. The method of claim 2, comprising repeating at least one time the steps of contacting the at least a portion of the optical waveguide with the solution and at least partially removing the liquid solvent from the layer of solution supported on the optical waveguide.

4. The method of claim 1, wherein the at least partial removal of the solvent is accomplished through one or more of spontaneous evaporation of the solvent, air blowing, and pulling the optical waveguide out of the solution.

5. The method of claim 1, further comprising a step of heating the optical waveguide having the coating of BNNTs formed on the surface thereof at a temperature above 25° C. and below the melting temperature of the optical waveguide.

6. The method of claim 5, wherein the temperature is 125° C. or higher.

7. The method of claim 1, wherein the BNNTs are non-covalently associated with at least one polymer.

8. The method of claim 1, wherein:
   the BNNTs are non-covalently dispersed with a cationic or anionic surfactant; and/or,
   the BNNTs are covalently functionalized.

9. The method of claim 8, wherein the BNNTs are covalently functionalized with at least one hydroxyl (OH) group, at least one amine ($NH_2$) group, or at least one hydroxyl (OH) group and at least one amine ($NH_2$) group.

10. The method of claim 8, wherein the BNNTs are covalently functionalized with at least one hydrophilic functional group.

11. The method of claim 1, further comprising treating the at least a portion of the surface of the optical waveguide with a hydrofluoric acid solution to increase uniformity of hydrophilicity across the treated surface prior to contacting the at least a portion of the optical waveguide with the solution.

12. The method of claim 1, wherein the optical waveguide is an optical fiber.

13. The method of claim 12, wherein the coating of the BNNTs is formed on at least a portion of the optical fiber that defines a taper and/or a fiber Bragg grating.

14. The method of claim 1, wherein the BNNT solution comprises metal particles associated with the BNNTs and/or the method further comprises a step of coating the BNNT coating with a metal.

15. An optical waveguide comprising:
   a physical structure that is capable of guiding electromagnetic waves in the optical spectrum; and
   a coating on at least a portion of a surface of the physical structure, wherein the coating comprises boron nitride nanotubes (BNNTs).

16. The optical waveguide of claim 15, wherein the physical structure is an optical fiber, the optical fiber comprising:
   a core having a first index of refraction; and
   a cladding having a second other index of refraction that is lower than the first index of refraction.

17. The optical waveguide of claim 15 or 16, wherein a maximum thickness of the coating is 1 mm and a minimum thickness of the coating is a single layer of individual BNNTs.

18. The optical waveguide as defined in claim 16 for use in an environment having levels of neutron radiation above 0.3 mSv/year and a temperature of 700° C. or higher.

19. The optical waveguide of claim 15, wherein a maximum thickness of the coating is between 1 pm and 10 pm and a minimum thickness of the coating is a single layer of individual BNNTs.

20. The optical waveguide of claim 15, wherein the coating has a variance in thickness of less than 200 nm.

21. The optical waveguide of claim 15, wherein the coating substantially covers the surface of the physical structure.

22. The optical waveguide of claim 15 wherein the coating comprises a plurality of separately applied layers of BNNTs more aligned to the longitudinal fiber axis than random orientation.

23. The optical waveguide of claim 22, wherein the BNNT coating is aligned with a variable degree of alignment through a dip-coating process or a spray-coating process.

24. The optical waveguide of claim 15, wherein:
   a portion of the optical fiber defines a taper having a waist and wherein the BNNT coating is formed at least on the waist of said portion; and/or,
   a portion of the optical fiber is a fiber Bragg grating and wherein the BNNT coating is formed at least on said portion of the optical fiber.

25. The optical waveguide of claim 15, wherein:
   polyhedral boranes are confined inside the BNNTs;
   the BNNT coating comprises at least one polymer matrix;
   the coating comprises BNNTs infiltrated with a filler, wherein the filler comprises a polymer, an epoxy resin, nanoparticles, or a combination of any two or more thereof; or,
   any combination thereof.

26. The optical waveguide produced according to claim 15 for use in an environment having a temperature above 400° C.

27. A sensor comprising:
   an optical waveguide as defined in claim 15,
   an optical light source configured to transmit optical light into the optical waveguide, and an optical power meter configured to receive a transmission of optical light from the optical waveguide.

28. The sensor of claim 27, wherein the sensor is a neutron sensor, a chemical sensor, a humidity sensor, a temperature sensor, a strain sensor, or a biosensor.

* * * * *